(12) United States Patent
Bauder et al.

(10) Patent No.: US 7,203,247 B2
(45) Date of Patent: Apr. 10, 2007

(54) DIGITAL PREDISTORTION TECHNIQUE FOR WCDMA WIRELESS COMMUNICATION SYSTEM AND METHOD OF OPERATION THEREOF

(75) Inventors: Ruediger Bauder, Otterfing (DE); Qing Yan, Allentown, PA (US); Jeffrey Lihbor Yiin, Bethlehem, PA (US)

(73) Assignee: Agere Systems Inc., Allentown, PA (US)

( * ) Notice: Subject to any disclaimer, the term of this patent is extended or adjusted under 35 U.S.C. 154(b) by 766 days.

(21) Appl. No.: 09/911,139

(22) Filed: Jul. 23, 2001

(65) Prior Publication Data

US 2003/0035494 A1    Feb. 20, 2003

(51) Int. Cl.
    *H04L 25/49* (2006.01)
(52) U.S. Cl. .................... 375/296; 375/297; 455/114.3
(58) Field of Classification Search ........ 375/284–285, 375/296–297; 455/63.1, 126, 114.2–114.3; 330/149; 332/103, 162, 160, 159, 124, 123
    See application file for complete search history.

(56) References Cited

U.S. PATENT DOCUMENTS

| | | | | |
|---|---|---|---|---|
| 6,054,896 A | * | 4/2000 | Wright et al. | 330/149 |
| 6,141,390 A | * | 10/2000 | Cova | 375/297 |
| 6,240,144 B1 | * | 5/2001 | Ha | 375/297 |
| 6,275,685 B1 | * | 8/2001 | Wessel et al. | 455/126 |
| 6,288,610 B1 | * | 9/2001 | Miyashita | 330/149 |
| 6,313,703 B1 | * | 11/2001 | Wright et al. | 330/149 |
| 6,373,902 B1 | * | 4/2002 | Park et al. | 375/296 |
| 6,587,513 B1 | * | 7/2003 | Ichihara | 375/296 |
| 6,711,217 B1 | * | 3/2004 | Jeong | 375/297 |

OTHER PUBLICATIONS

Haobo Lai and Y. Bar-ness; Minimum Distortion Power Polynomial Model (MDP-PM) of Nonlinear Power Amplifiers and its Application on Analog Predistorters; 1999 IEEE; pp. 1501-1505.
Lars Sundstrom; Digital RF Power Amplifier Linearisers—Analysis and Design; 1995; Lund University; Sweden.
Adel A.M. Saleh; Frequency-Independent and Frequency-Dependent Nonlinear Models of TWT Amplifiers; IEEE Transactions on Communications, vol. 29, No. 11, 1981 IEEE; pp. 1715-1720.

\* cited by examiner

*Primary Examiner*—Khanh Tran

(57) ABSTRACT

A Wideband Code-Division Multiple Access (WCDMA) transceiver and a method of operating the same. In one embodiment, the transceiver includes: (1) a transmit chain having a lookup table that provides coefficients to a digital predistorter based on power indicators and (2) a predistorter training circuit, coupled to the transmit chain, that employs a receive chain of the WCDMA transceiver to provide a digital compensation signal that is a function of an output of the transmit chain and employs both the power indicators and the digital compensation signal to cause the lookup table to provide alternative coefficients to the digital predistorter thereby to reduce distortion in the output.

20 Claims, 3 Drawing Sheets

DIGITAL PREDISTORTION TECHNIQUE FOR WCDMA WIRELESS COMMUNICATION SYSTEM AND METHOD OF OPERATION THEREOF

TECHNICAL FIELD OF THE INVENTION

The present invention is directed, in general, to wireless communications and, more specifically, to a digital predistortion technique for a Wideband Code-Division Multiple Access (WCDMA) wireless communication system and method of operating the same.

BACKGROUND OF THE INVENTION

The Wideband Code-Division Multiple Access (WCDMA) standard has been widely adopted in several third generation (3G) mobile communication systems. One major design challenge in the WCDMA transmitter, both for a mobile terminal and a workstation, is to improve the linearity and efficiency of the power amplifier (PA). This can be due to the non-constant envelope modulation and the multi-code scheme used in WCDMA. Nonlinear PA causes spectrum regrowth which results in significant adjacent channel interference (ACI). At present, the state-of-art linear PAs for the wideband applications provide about −40 dB adjacent channel power reduction (ACPR) at 5 MHz and −50 dB at 10 MHz, which fails to fulfill the 3G requirement on the output spectral mask. However, this gap can hardly be solved by PA back-off which will cause severe losses in power efficiency.

The third generation wireless systems place much more difficult linearity and efficiency requirements for the RF front-end. The linearity constraint is due to tighter output spectral mask specification, higher signal envelope variations (linear modulation), and, in the case of the PA, the need to keep the operation level near the compression point in order to achieve a high enough efficiency. In addition, when multi-code transmission is applied, more backoff is needed, causing a loss of efficiency. Linearization techniques are considered as one possible solution to overcome the tightened spectral mask requirements with acceptable amplifier efficiency.

Linearization techniques can be divided into four main categories: (1) feedforward, (2) feedback, (3) envelope elimination and restoration, and (4) predistortion. Each of these have a set of variants providing different implementation complexity, adjacent channel interference (ACI) improvements, and bandwidth/convergence rates.

The first three categories are suited for analog implementation. Feedforward can, in theory, completely eliminate the inter-modulation distortion, but the key problem of this scheme is the need of perfect gain and phase match between the two signal paths. The complexity of this scheme is quite large and the total efficiency is drained due to losses in the main path delay, the couplers and the auxiliary amplifier. Among the various feedback techniques, Cartesian feedback is most prominent and thoroughly studied. It has been proven to work for wideband applications. Polar modulation feedback is most suitable for narrowband systems. The power efficiency of these techniques is low for low input levels. Moreover, the complexity of these schemes is also quite high.

In the envelope elimination and restoration scheme, a modulated intermediate frequency (IF) signal is split into its polar components. The constant-envelope IF signal is translated to RF with a mixer and amplified to a level forcing the power amplifier to saturate. The envelope is restored by modulating the supply voltage to the power amplifier with the detected IF envelope. For more information, please see L. Sundstrom, "Digital RF Power Amplifier Linearisers—Analysis and Design," *Dissertation for the degree of Ph.D*, LUTEDX/(TETE-1013)/1–150(1995), Lund university, Sweden, August 1995, which is hereby incorporated by reference in its entirety.

Predistortion can be realized at baseband by the DSP techniques or at RF with nonlinear devices. Digital baseband solution is usually preferred, since it is better suited for tracking any possible change in PA parameters. Mapping predistortion has been proposed, using a huge two-dimensional table. The more memory efficient scheme is the complex gain predistortion which has a one-dimensional table and can compensate phase invariant nonlinearities. Adaptive algorithm is frequently used for tracking the variations of the PA parameters. It requires large computing power and a dedicated feedback loop. Available research shows that it is suited for narrowband systems only.

Accordingly, what is needed in the art is a WCDMA transceiver which employs linearization techniques that overcome the limitations of the prior art.

SUMMARY OF THE INVENTION

To address the above-discussed deficiencies of the prior art, the present invention provides a WCDMA transceiver and a method of operating the same. In one embodiment, the transceiver includes: (1) a transmit chain having a lookup table that provides coefficients to a digital predistorter based on power indicators and (2) a predistorter training circuit, coupled to the transmit chain, that employs a receive chain of the WCDMA transceiver to provide a digital compensation signal that is a function of an output of the transmit chain and employs both the power indicators and the digital compensation signal to cause the lookup table to provide alternative coefficients to the digital predistorter thereby to reduce distortion in the output.

The present invention therefore introduces the broad concept of employing the receive chain, instead of dedicated hardware, to create a closed feedback loop designed to reduce distortion in the output of a WCDMA transceiver.

In one embodiment of the present invention, the transmit chain includes: (1) an interpolator coupled to an output of the digital predistorter, (2) a digital to analog converter coupled to an output of the interpolator, (3) a low pass filter coupled to an output of the digital to analog converter, (4) a quadrature modulator coupled to an output of the low pass filter and (5) an amplifier coupled to an output of the quadrature modulator. The structure and operation of an exemplary transmit chain will be set forth in detail in the Detailed Description that follows. Those skilled in pertinent art will understand, however, that alternative transmit chain architectures are within the broad scope of the present invention.

In one embodiment of the present invention, the receive chain includes: (1) a quadrature de-modulator, (2) a low pass filter coupled to an output of the quadrature de-modulator and (3) an analog to digital converter coupled to an output of the low pass filter. The structure and operation of an exemplary receive chain will be set forth in detail in the Detailed Description that follows. Those skilled in pertinent art will understand, however, that alternative receive chain architectures are within the broad scope of the present invention.

In one embodiment of the present invention, the predistorter training circuit comprises a coefficient update circuit to generate alternative power indicators for the lookup table. In a more specific embodiment, the power indicators include both real and quadrature components. Those skilled in the pertinent art will understand that alternative architectures may call for the generation of alternative forms of power indicators.

In one embodiment of the present invention, the predistorter training circuit operates only in a training mode. Alternatively, the predistorter training circuit may operate while the transceiver is in its normal transmit mode.

In one embodiment of the present invention, a root-raised cosine circuit provides the power indicator. Though the present invention is not so limited, those skilled in the pertinent art are familiar with root-raised cosine circuits and their operation.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
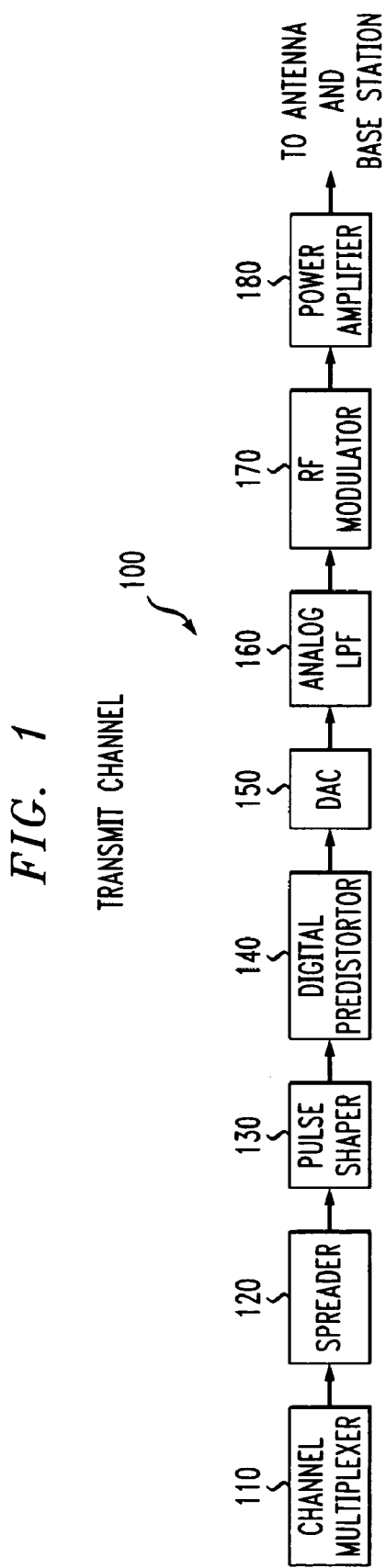
FIG. 1 illustrates a transmit channel which is one environment in which the present invention may operate.

Referring initially to FIG. 1, illustrated is a transmit channel 100 of a transceiver which embodies one environment in which the present invention may operate. Briefly, the transmit channel 100 may have a channel multiplexer 110, which multiplexes, or combines, various output signals. The channel multiplexer is connected to a spreader 120, which performs such functionality as preparing the output signal for a spread-spectrum transmission. Coupled to the spreader 120 is a pulse shaper 130. The pulse shaper 130 may be a filter, such as a raised root cosine (RRC) filter, although those skilled in the art should understand that any appropriate filter may be used.

After the pulse shaper 130, a connected digital predistorter 140 ("predistorter 140") is then employed. Predistortion can be realized at baseband by using DSP techniques, or alternatively at radio frequency by using the non-linear characteristics of an analog predistorter. The predistorter 140 is generally responsible for compensating for non-linearities which may be introduced into the system, such as by a power amplifier (PA) 180. In the present embodiment, digital base-band solution is preferred, since it is better suited for tracking any possible change in the PA parameters. The predistorter 140 will be described in more detail at a later point.

After the output signal has been processed by the predistorter 140, it is then transformed into the analog output signal in a digital to analog converter (DAC) 150. Uses and applications of DACs are well known to those skilled in the art, and will therefore not be described in more detail.

Once the output signal has been converted into analog form by the DAC 150, the output signal is then filtered by an analog low pass filter (LPF) 160. The analog LPF 160 may be a Butterworth filter. After being filtered by the analog low pass filter 160, the output signal is then modulated by an RF modulator 170. The RF modulator 170 may perform such functionality as QAM modulation.

After the RF modulator 170 has performed, the PA 180 is employed for such purposes as to increase the power of the transmitted signal. The PA 180 may be typically operated at close to saturation to help ensure effective utilization of the PA 180. However, operation in such as the above manner may lead to various non-linearities within the transmit channel 100. Finally, after the PA 180 has been employed, the amplified output signal may be broadcasted by the antenna 190.

Figure 2:
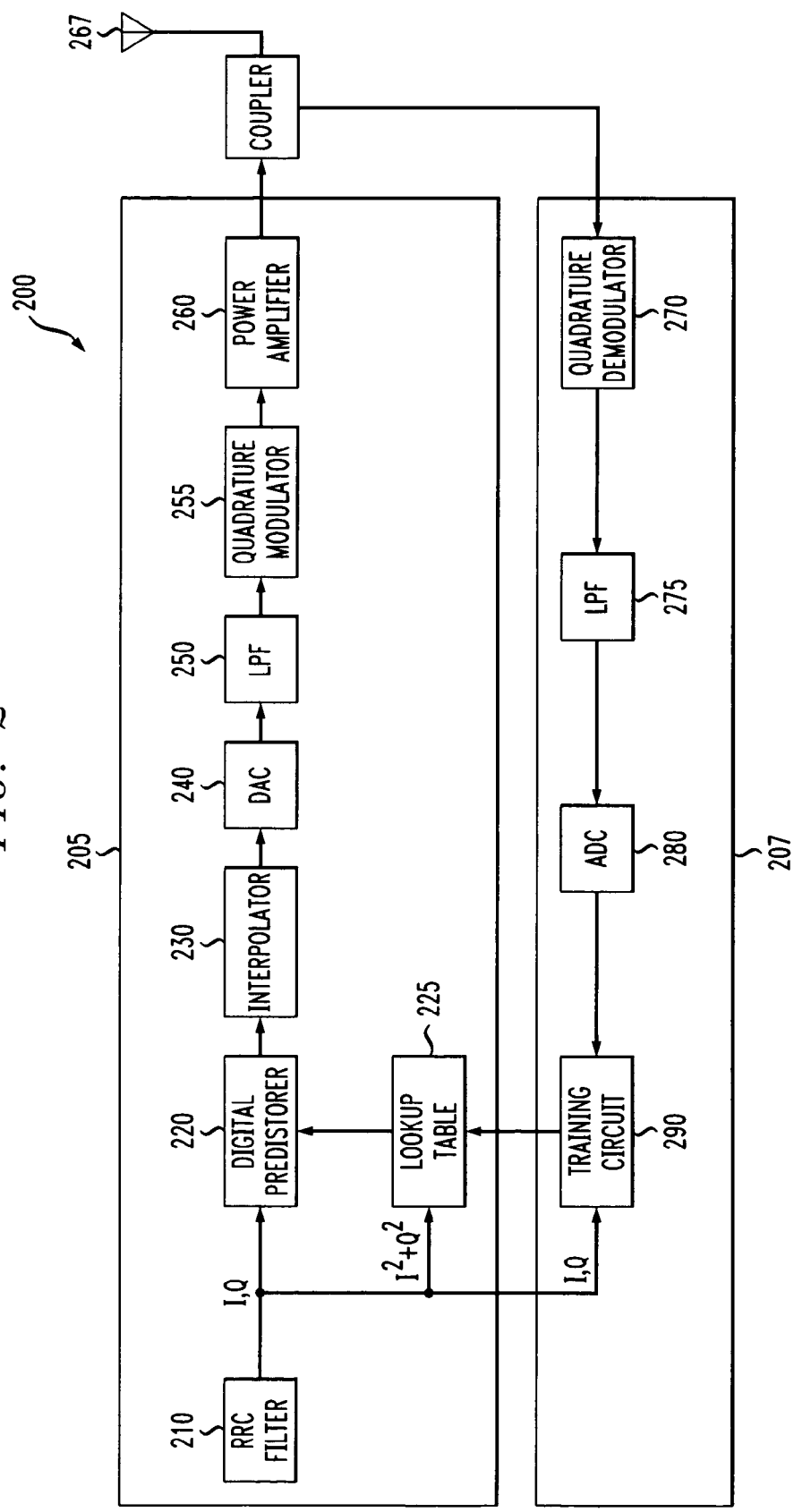
FIG. 2 illustrates one embodiment of a pre-distortion system which utilizes a receive chain as a feedback loop for altering pre-distortion coefficients.

Turning now to FIG. 2, illustrated is one embodiment of a predistortion system 200 which utilizes a receive chain as a feedback loop for altering pre-distortion coefficients. One goal of the predistortion system 200 is to provide a simple but efficient digital baseband linearization method suited for the WCDMA transmit channel 100. A concern in implementing the predistortion system 200 is how to implement a feedback loop needed for tracking the change in the PA parameters. A dedicated feedback loop would be nice for this purpose, but it will substantially increase the overall complexity.

In the illustrated embodiment of the predistortion system 200, one around the dilemma of a dedicated feedback loop is to take advantage of a compressed mode of protocol, such as a Universal Mobile Telecommunications System (UMTS) protocol. In UTMS, a transmission gap (TG) may be inserted periodically or upon a request basis during the normal traffic mode upon a transmit chain 205. This TG may then be employed by a receive chain 207 and the receive chain 207 will serve as the feedback loop temporarily.

In a "normal transmission" mode the transmit train 205 works alone, separate from the receive chain 207. The transmit chain 205 has an RRC filter 210, a digital predistorter 220 ("predistorter 220"), a lookup table which forms a basis for the digital predistortion functionality of the predistorter 220, an interpolator 230, a DAC 240, a LPF 250, a quadrature modulator 255, and a power amplifier 260. A list of complex numbers is stored in the lookup table 225, addressed by the power of the input signal.

More specifically, in the predistortion system 200, the output of the DAC 240 is fed into the LPF 250 which may generally act as an anti-aliasing filter to remove the images at integer multiples of sampling frequency. As addressed in J. Yiin, "CPS4: GSM/UMTS Baseband Mixed-Signal chip", Lucent Technologies internal document, V0.9, Apr. 27, 2000, (which is hereby incorporated by reference in its entirety) the LPF 250 with cutoff frequency around 3.0 MHz would be desirable for this purpose and also for limiting the out-of-band noise.

The adoption of the predistorter 220 calls for the LPF 250 with much larger cut-off frequency than normally used in configurations without predistortion. Since the predistorter 220 is basically a nonlinear component, the baseband signal at the predistorter 220 output will have much larger bandwidth than the incoming signal. In order to achieve the best effects on reducing ACI, the LPF 250 must leave the desired harmonics in the distorter 220 output intact for the next stage, which requires the cut-off frequency be as large as possible. (On the other hand, the LPF 250 still needs to fulfil the task of removing the images at integer multiples of sampling frequency, which makes a smaller cutoff frequency more desirable.)

The transmit chain 205 is then coupled to a coupler 265 which may be coupled to an antenna 267. Where appropriate, the various elements of the transmit train 205, such as the predistorter 220 and the lookup table 225, will be described in more detail below.

During a "training" mode of operation, however, (to be described in more detail below) for the predistorter 220, the transmit chain 205 and the receive chain 207 cooperate through the use of the coupler 265 to form a loop through the receive train 207, and the antenna 267 is disconnected from the transmit chain 205.

The receive train 207 has a quadrature demodulator 270, which extracts incoming information and demodulates the signal into a single one-dimensional analog value. This demodulated analog signal then passes through an LPF 275, perhaps a Butterworth filter, and then is converted into digital form by an analog to digital converter (ADC) 280. Finally, the now digital coefficients corresponding to the demodulated signal are received by a training circuit 290, which may then update the lookup table 225 with appropriate and/or alternative coefficients, as a function of the output of the transmit train 205, through a digital compensation signal to reduce distortion in the output of the PA 260, in a manner also to be described in more detail below. The training circuit 290 would generally operate only when the predistortion system 200 is in training mode. The training circuit 290 employs both the "in phase I" and "quadrature Q" (i.e. the "power indicators" have a real and quadrature component) information of the signal input to calculate the proper alternative coefficients for the lookup table 225.

However, since the measured PA 260 transfer function is actually an approximation of the entire feedback loop (and the transfer function expresses any nonlinearities), all of the nonlinearity in the transmit train 205 can be compensated, in theory, by the predistorter 220, while the nonideality in the receive channel will be emphasized by the predistorter 220 due to the estimation error. This may suggest that the linearity requirements for the receive chain 207 should be more stringent for the sake of accurate PA 260 estimation. Adaptation is achieved by the recurrence of the training interval, considering the fact that the temperature and time variations of the PA parameters are generally very slow.

Predistortion of the predistortion system 200 is generally performed by multiplying a source signal for transmission by complex gain factors obtained from the lookup table 225 (which is pre-calculated during the training period) within the predistorter 220. In one embodiment of the present invention, a "training sequence" (to be described later on in more detail) is injected into the transmit chain 105 between the spreader 120 and the pulse shaper 130 (perhaps employing the RRC filter 210), during the training interval. The output of the RRC filter 210 is then stored in RAM and will be referred to as the input signal. The input signal is then predistorted by the predistorter 220 using predistortion coefficients stored in the lookup table 225 which were obtained during last training period before transmission. For the first training period, the coefficients within the lookup table 225 can be set to "1" or any reasonable number for use by the predistorter 220.

In other words, after the entire training sequence has been transmitted and detected, the nonlinear characteristics of the PA 260 can be calculated by the training circuit 290, using methods to be revealed below. The training circuit 290 is then employed to update the alternative predistortion coefficients through the digital compensation signal to cause the lookup table 225 to provide alternative coefficients to the predistorter 220. The lookup table 225 employs the power indicators $I^2$ plus $Q^2$. Interpolation by the interpolator 230 is used to lessen the requirements for the LPF 250.

More specifically, an output of the RRC filter 210 is stored in RAM and will be used as the reference signal for the PA 260 signal distortion estimation when comparing the output training signal of the RRC filter 210 to the input of the training circuit 290. For simplicity, the training sequence is injected into the transmit chain 100 between the spreader 120 and the pulse shaper 130, perhaps employing the RRC filter 210.

The training chip sequence should be designed such that the output of RRC sweeps the entire dynamic range of the PA 180 in magnitude. Such sequences are obtained by a random search. Each of the sequence in Table I is selected from 100,000 randomly generated sequences. Each time a random sequence is generated, the corresponding RRC filter 210 output and the power density function (PDF) of the output signal power are calculated by the transmit channel 100. Only the sequence which minimizes the variance of the PDF is chosen. After generation, a window function is also applied by the training circuit 290 to smooth the coefficients. The window function [¼ ½ ¼] may be used for the first half of the table where the coefficients are typically very close to each other and the window function [−⅛ ⅜ ½ ⅜ −⅛] may be used for the rest where rapid changes may be present. The boundary points are adjusted so that the first entry has zero phase and the last one has a magnitude of 1. One such table of random training sequences is given below:

TABLE 1

TRAINING SEQUENCES OF DIFFERENT LENGTHS

| Number of Chips | I channel | Q channel |
|---|---|---|
| 10 | 0 19 32 −19 18 92<br>−51 22 −72 0 | 0 96 −32 −69 15<br>1 100 −78 −69 0 |
| 20 | 0 92 21 39 37 −58<br>−57 −57 −58 −93<br>87 −47 54 54 28 5<br>95 −79 50 0 | 0 54 28 −18 −44<br>59 79 −43 90 7<br>30 2 −91 −43 24<br>−79 −38 −78 −59 0 |
| 30 | 0 87 26 17 −27 50<br>91 20 −69 1 −82 82<br>88 −16 −48 −14 −72<br>−20 29 96 −36 10 −8<br>49 77 −49 76 −59<br>−30 0 | 0 −67 −15 −84 85<br>−21 81 −56 78 −47<br>86 −40 52 3 29 −65<br>−99 −52 68 50 −47<br>−35 8 12 −8 76 −61<br>21 32 0 |
| 40 | 0 19 32 −19 18 92<br>−51 22 −72 0 0 87<br>26 17 −17 50 91<br>26 17 −82 82 88<br>−16 −48 −14 −72<br>−20 96 −36 10 −8<br>49 77 −49 76 −59<br>−30 0 | 0 96 −32 −96 15 1<br>100 −78 −69 0 0<br>−67 −15 −84 85 −21<br>81 −56 78 −47 86<br>−40 52 37 29 −65<br>−99 31 52 68 50 −47<br>−35 8 12 −8 76<br>−61 −21 32 0 |

Now the characteristics, functionality and interplay between and among the transmit chain 205 and the training circuit 290 shall be described in more detail. As a prerequisite to this discussion, let the input signal to the PA 260 be described by:

$$x(t) = r(t)\cos(w_0 t + \phi(t))$$

where $w_0$ is the carrier frequency, and $r(t)$ and $\phi(t)$ are a modulated envelope and phase, respectively.

In an amplitude-phase model, the corresponding output is written as:

$$y(t) = A(r(t))\cos\{w_0 t + \phi(t) + \Phi(r(t))\},$$

where $A(r(t))$ is an odd function of r, with a linear leading term representing amplitude-to-amplitude (AM-AM) conversion, and $\Phi(R)$ is an even function of r, with a quadratic leading term representing amplitude-to-phase (AM-PM) conversion. In literature (A. Saleh, "Frequency-Independent and Frequency-Dependent Nonlinear Models of TWT Amplifiers," *IEEE Trans. On Commun.*, Vol. 29, No. 11, pp 1715–1720, November, 1981, (which is hereby incorporated by reference in its entirety), two-parameter formulas are frequently used to model power amplifier characteristics:

$$A(r) = \alpha_a r/(1+\beta_a r^2), \Phi(r) = \alpha_\phi r^2/(1+\beta_\phi r^2).$$

The parameters are determined by the specific PA 260 to be modelled. The time varying nature is not accounted for here because the variation is assumed to be very slow as compared to the updating period.

To further elaborate upon the above, the predistorter 220 compensates for the nonlinearity of the PA 260, but the predistorter 220 should be supplied with the proper predistortion coefficients. The overall performance gain achieved by predistortion of the predistorter 220 is determined by the accuracy of PA 260 distortion estimation by the training circuit 290. One goal of the present invention is to obtain the coefficients for predistortion for use of the predistorter 220, which requires the inverse of the PA 260 transfer function, calculated by the training circuit 290 and the results thereof stored in the lookup table 225. One of the following two procedures may be used, that is, that of estimating the PA 260 transfer function first followed by computing the PA 260 inverse, or estimating the PA 260 inverse directly.

AM-AM and AM-PM conversions directly obtained from the input and output signal are distorted because of errors caused by quantization and other nonidealities. A curve-fitting method has to be used to reconstruct the PA 260 characteristics more accurately and smoothly.

In this two-step procedure of estimating the PA 260 characteristics, the characteristics are first reconstructed by using a polynomial model, then the inverse of the PA 260 transfer function is solved by the training circuit 290 for filling up the lookup table 225.

The curve-fitting method from H. Lai and Y Bar-Ness, "Minimum Distortion Power Polynomial Model (MDP-PM) of Nonlinear Power Amplifiers and Its Application to Analog Predistorters," VTC '99 Fall, Amsterdam, The Netherland, pp. 1501–1505, September 1999 (which is incorporated by reference in its entirety] where a polynomial model is used. In this model, the relationship between the input and output signal for any given time t is given by $$V_0(t) = V_i(t)\{\Sigma_{k=1}^K \alpha_{2k-1}|V_i(t)|^{2k-2}\} + V_e(t)$$

(2) where $V_i(t)$ and $V_O(t)$ are the input and output signal at time t, respectively, and $V_e(t)$ is the error signal. The value of K defines the order of the polynomial used for reconstruction, i.e., $2K-1$. Normally, $K=3$ is enough, which corresponds to a 5th order polynomial. The coefficients $\alpha$'s will be determined by curve-fitting, using the minimum distortion power criterion of H. Lai and Y. Bar-Ness, where the power of the error signal $V_e$ is minimized.

Define $$\alpha = \begin{bmatrix} \alpha_1 \\ \alpha_3 \\ \cdots \\ \alpha_{2K-1} \end{bmatrix}, V_i = \begin{bmatrix} V_i(t_1) \\ V_i(t_2) \\ \cdots \\ V_i(t_n) \end{bmatrix}, V_o = \begin{bmatrix} V_o(t_1) \\ V_o(t_2) \\ \cdots \\ V_o(t_n) \end{bmatrix},$$

$$V_I = \begin{bmatrix} V_i(t_1)V_i(t_1)|V_i(t_1)|^2 \cdots V_i(t_1)|V_i(t_1)|^{2K-2} \\ V_i(t_2)V_i(t_2)|V_i(t_2)|^2 \cdots V_i(t_2)|V_i(t_2)|^{2K-2} \\ \cdots \\ V_i(t_n)V_i(t_n)|V_i(t_n)|^2 \cdots V_i(t_n)|V_i(t_n)|^{2K-2} \end{bmatrix}$$

where n is the number of samples in the input/output signals. It is proved that the solution $$\alpha = (V_I^H V_I)^{-1}(V_I^H V_O)$$

minimizes the distortion power.

To realize the predistorter 220, it is necessary to know what is the appropriate predistorted signal for the desired output. In other words, the inverse of the estimated PA transfer function which is a polynomial must be derived. This is not easy because there is no general way of solving high-order (the order is 5 in our case for $K=3$) polynomial equations efficiently. Typically, an iterative method can be used to solve this problem:

$$V_i^{(l)}(t) = V_O(t)/\{\Sigma_{k=1}^K \alpha_{2k-1}|V_i^{(l-1)}(t)|^{2k-2}\} \text{ at iteration l.}$$

The number of iterations needed is dependent on the slope of the AM-AM curve at the operation point. For the operation point near saturation, the slope is flat, which leads to a relatively large number of iterations (about 6). Of course, if the initial value is close enough to the correct solution, two or three iterations are enough. The initial value can be pre-calculated and stored. Another possible way is to use the value obtained in the last training period and, therefore, only one or two iterations may be needed assuming the variation of the PA parameters is slow compared with the updating period. These calculations would be typically performed within the training circuit 290, and the training circuit 290 then uses the above values to further determine the coefficients stored within the lookup table 225 for use by the predistorter 220.

However, The two-step solution discussed above is computationally power consuming since we need to repeat this process for each of the table entries. To save computation power, a one-step solution may also be used. Actually, the inverse of PA 260 transfer function can be estimated directly by the same curve-fitting method. One needs only to exchange the input and output in the above equations. Assume the polynomial model $$V_i(t) = V_o(t)\{\Sigma_{k=1}^K \beta_{2k-1}|V_o(t)|^{2k-2}\} + V_e(t)$$

define $$\beta = \begin{bmatrix} \beta_1 \\ \beta_3 \\ \cdots \\ \beta_{2K-1} \end{bmatrix}, V_i = \begin{bmatrix} V_i(t_1) \\ V_i(t_2) \\ \cdots \\ V_i(t_n) \end{bmatrix},$$

-continued $$V_o = \begin{bmatrix} V_o(t_1)V_o(t_1)|V_o(t_1)|^2 \cdots V_o(t_1)|V_o(t_1)|^{2K-2} \\ V_o(t_2)V_o(t_2)|V_o(t_2)|^2 \cdots V_o(t_2)|V_o(t_2)|^{2K-2} \\ \cdots \\ V_o(t_n)V_o(t_n)|V_o(t_n)|^2 \cdots V_o(t_n)|V_o(t_n)|^{2K-2} \end{bmatrix}$$

the polynomial coefficients given by:

$$\beta = (V_O^H V_O)^{-1}(V_O^H V_i)$$

will minimize the power of the error signal $V_e(t)$. In this way, the training circuit 290 can directly compute the predistorted signal for a given output by the following equation:

$$V_i(t) = V_O(t)\{\Sigma_{k=1}^{K} \beta_{2k-1}|V_o(t)|^{2k-2}\}$$

Again, these calculations would be typically performed within the training circuit 290, and the training circuit 290 then uses the above values to further determine the coefficients stored within the lookup table 225 for use by the predistorter 220.

Both of the above methods should work well. In the following discussion the one-step method is further detailed, since the one-step method saves computation power. To compute the polynomial coefficients, about $(4K^2+4K+11)$ M multiplications and $(2K^2+2K+1)$ M additions are needed, where M is 4 times the number of chips and K is 3 for a 5th degree polynomial model. Computing the table entries requires 8T real multiplications and 4T real additions for a T-entry table. All of the operations are for real numbers.

Figure 3:
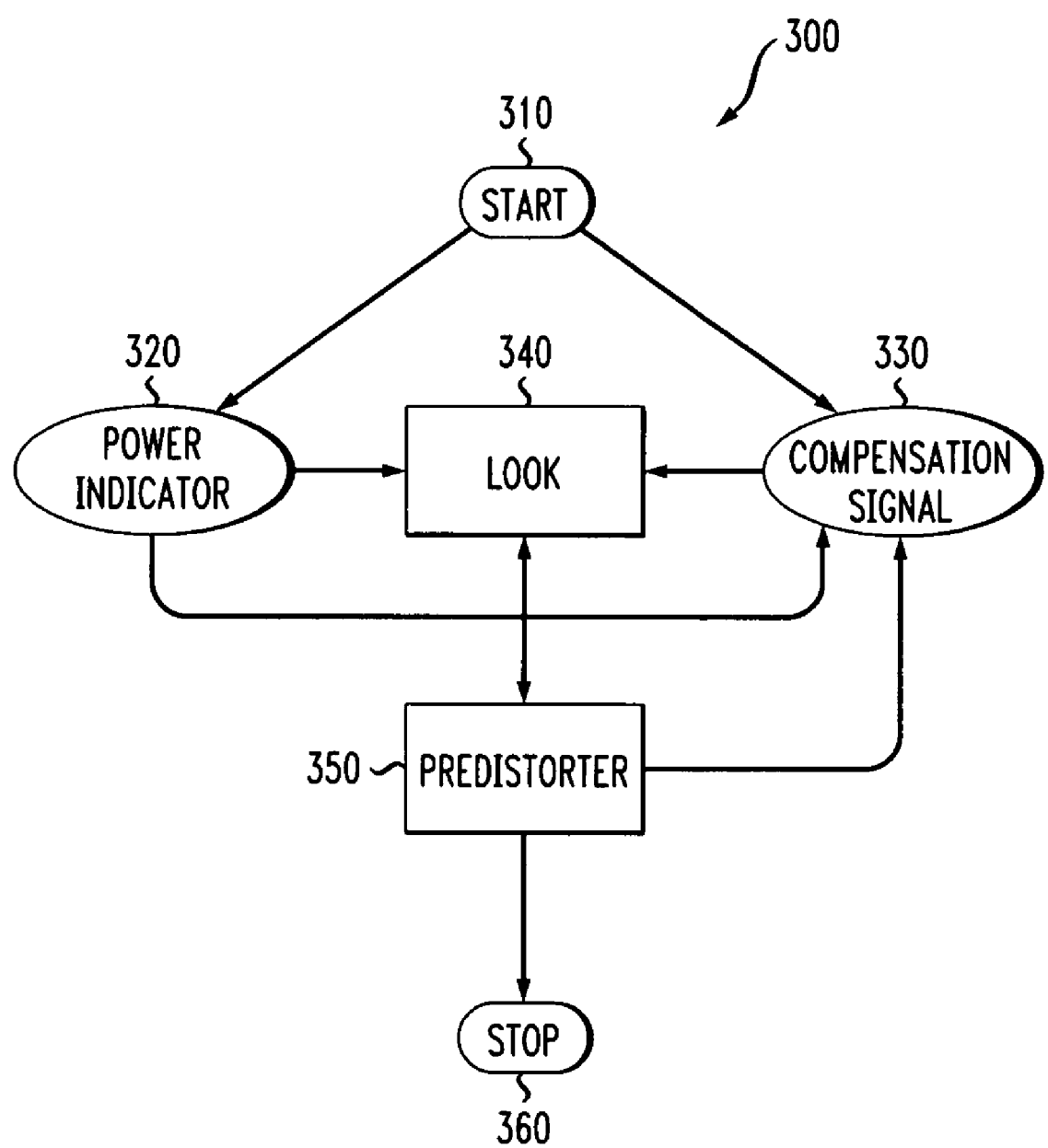
FIG. 3 illustrates a method of reducing distortion in an output of a WCDMA transceiver employing the principles of the present invention.

Turning now to FIG. 3, illustrated is a method 300 of reducing distortion in an output of a WCDMA transceiver employing the principles of the present invention. After the start 310, the method 300 then executes both a power indicator in a step 320 and a digital compensation signal in a step 330. The power indicator in the step 320 provides power coefficients to a lookup table in a step 340, which in turns provides coefficients in a predistorter step 350.

The digital compensation signal step 330 employs a receive chain of the WCDMA transceiver to create the digital compensation signal as a function of an output (e.g. the transfer characteristics) of the transmit train. Also, the digital compensation signal also employs the output of the power indicator of the step 320.

In the lookup table step 340, both the power indicators of the step 320 and the digital compensation signal are employed by the lookup table step 340 to cause the lookup table to provide alternative coefficients in the step predistorter 350. The output of the step 350 is input into the step 330 to be processed by the step 330 as a basis for the digital compensation signal. Finally, the method 300 stops at the step stop 360.

Although the present invention has been described in detail, those skilled in the art should understand that they can make various changes, substitutions and alterations herein without departing from the spirit and scope of the invention in its broadest form.

What is claimed is:

1. A WCDMA transceiver having an antenna, comprising:
   a transmit chain having a lookup table that provides coefficients to a digital predistorter based on power indicators; and
   a predistorter training circuit, coupled to said transmit chain, that employs a receive chain of said WCDMA transceiver during a training mode to provide a digital compensation signal that is a function of an output of said transmit chain and employs both said power indicators and said digital compensation signal to cause said lookup table to provide alternative coefficients to said digital predistorter thereby to reduce distortion in said output, wherein said antenna is disconnected from said transmit chain during said training mode.

2. The transceiver as recited in claim 1 wherein said transmit chain comprises:
   an interpolator coupled to an output of said digital predistorter;
   a digital to analog converter coupled to an output of said interpolator;
   a low pass filter coupled to an output of said digital to analog converter;
   a quadrature modulator coupled to an output of said low pass filter; and
   an amplifier coupled to an output of said quadrature modulator.

3. The transceiver as recited in claim 1 wherein said receive chain comprises:
   a quadrature De-modulator;
   a low pass filter coupled to an output of said quadrature De-modulator; and
   an analog to digital converter coupled to an output of said low pass filter.

4. The transceiver as recited in claim 1 wherein said predistorter training circuit comprises a coefficient update circuit to generate alternative power indicators for said lookup table.

5. The transceiver as recited in claim 1 wherein said power indicators include both real and quadrature components.

6. The transceiver as recited in claim 1 wherein said predistorter training circuit operates only in a training mode.

7. The transceiver as recited in claim 1 wherein a root-raised cosine circuit provides said power indicator.

8. A method of reducing distortion in an output of a WCDMA transceiver having an antenna, comprising:
   employing a lookup table to provide coefficients to a digital predistorter of a transmit chain based on power indicators;
   employing a receive chain of said WCDMA transceiver during a training mode to provide a digital compensation signal that is a function of an output of said transmit chain, said antenna disconnected from transmit chain during said training mode; and
   employing both said power indicators and said digital compensation signal to cause said lookup table to provide alternative coefficients to said digital predistorter.

9. The method as recited in claim 8 wherein said transmit chain comprises:
   an interpolator coupled to an output of said digital predistorter;
   a digital to analog converter coupled to an output of said interpolator;
   a low pass filter coupled to an output of said digital to analog converter;
   a quadrature modulator coupled to an output of said low pass filter; and
   an amplifier coupled to an output of said quadrature modulator.

10. The method as recited in claim 8 wherein said receive chain comprises:

a quadrature De-modulator;
a low pass filter coupled to an output of said quadrature De-modulator; and
an analog to digital converter coupled to an output of said low pass filter.

11. The method as recited in claim 8 wherein said employing both said power indicators and said digital compensation signal comprises generating alternative power indicators for said lookup table.

12. The method as recited in claim 8 wherein said power indicators include both real and quadrature components.

13. The method as recited in claim 8 wherein said employing both said power indicators and said digital compensation signal is carried out only in a training mode.

14. The method as recited in claim 8 wherein a root-raised cosine circuit provides said power indicator.

15. A WCDMA transceiver having an antenna, comprising:
   a transmit chain, including:
     a digital predistorter,
     a lookup table that provides coefficients to said digital predistorter based on power indicators,
     an interpolator coupled to an output of said digital predistorter,
     a digital to analog converter coupled to an output of said interpolator,
     a low pass filter coupled to an output of said digital to analog converter,
     a quadrature modulator coupled to an output of said low pass filter, and
     an amplifier coupled to an output of said quadrature modulator;
   a receive chain, including:
     a quadrature De-modulator,
     a low pass filter coupled to an output of said quadrature De-modulator,
     an analog to digital converter coupled to an output of said low pass filter; and
   a predistorter training circuit, coupled to said transmit chain, that employs said receive chain during a training mode to provide a digital compensation signal that is a function of an output of said transmit chain and employs both said power indicators and said digital compensation signal to cause said lookup table to provide alternative coefficients to said digital predistorter thereby to reduce distortion in said output, wherein said antenna is disconnected from said transmit chain during said training mode.

16. The transceiver as recited in claim 15 wherein said predistorter training circuit comprises a coefficient update circuit to generate alternative power indicators for said lookup table.

17. The transceiver as recited in claim 15 wherein said power indicators include both real and quadrature components.

18. The transceiver as recited in claim 15 wherein said predistorter training circuit operates only in a training mode.

19. The transceiver as recited in claim 15 wherein a root-raised cosine circuit provides said power indicator.

20. The transceiver as recited in claim 15 wherein said transceiver is located within a cellular telephone.

* * * * *